US 9,476,283 B2

(12) United States Patent
Fischer et al.

(10) Patent No.: US 9,476,283 B2
(45) Date of Patent: *Oct. 25, 2016

(54) GEOTHERMIC HEATER SYSTEM

(71) Applicant: DELPHI TECHNOLOGIES, INC., Troy, MI (US)

(72) Inventors: Bernhard A. Fischer, Honeoye Falls, NY (US); Charles Joseph Badura, Penfield, NY (US); Giulio Angel Ricci-Ottati, Burton, MI (US); James D. Richards, Spencerport, NY (US)

(73) Assignee: Delphi Technologies, Inc., Troy, MI (US)

( * ) Notice: Subject to any disclaimer, the term of this patent is extended or adjusted under 35 U.S.C. 154(b) by 104 days.

This patent is subject to a terminal disclaimer.

(21) Appl. No.: 14/249,433

(22) Filed: Apr. 10, 2014

(65) Prior Publication Data

US 2015/0292298 A1  Oct. 15, 2015

(51) Int. Cl.
*E21B 36/00* (2006.01)
*E21B 43/24* (2006.01)
*H01M 8/06* (2016.01)
*F24J 3/08* (2006.01)

(52) U.S. Cl.
CPC ............. *E21B 36/008* (2013.01); *E21B 43/24* (2013.01); *F24J 3/08* (2013.01); *H01M 8/0662* (2013.01); *H01M 2250/405* (2013.01); *Y02B 90/16* (2013.01); *Y02E 60/50* (2013.01)

(58) Field of Classification Search
CPC ............. E21B 36/008; E21B 43/2401; E21B 43/243; H01M 8/04022; H01M 8/2475; H01M 8/249
See application file for complete search history.

(56) References Cited

U.S. PATENT DOCUMENTS

| | | |
|---|---|---|
| 6,684,948 B1 | 2/2004 | Savage |
| 6,720,099 B1 | 4/2004 | Haltiner, Jr. |
| 7,182,132 B2 | 2/2007 | Savage |
| 2001/0049039 A1* | 12/2001 | Haltiner, Jr. ...... H01M 8/04022 429/440 |
| 2004/0200605 A1 | 10/2004 | Yoshida et al. |
| 2004/0229096 A1 | 11/2004 | Standke et al. |
| 2006/0147771 A1 | 7/2006 | Russell et al. |
| 2007/0048685 A1 | 3/2007 | Kuenzler et al. |
| 2010/0163226 A1* | 7/2010 | Zornes ................ E21B 41/0085 166/268 |
| 2012/0094201 A1 | 4/2012 | Haltiner, Jr. et al. |

OTHER PUBLICATIONS

"Phase 1 Report, Geothermic Fuel Cell In-Situ Applications for Recovery of Unconventional Hydrocarbons"; Independent Energy Partners; Title: Geothermic Fuel Cells: Phase 1 Report, Dated Jun. 7, 2010.
U.S. Appl. No. 14/081,068; Fischer et al, filed Nov. 15, 2013.
U.S. Appl. No. 14/013,708; Fischer et al., filed Aug. 29, 2013.

* cited by examiner

*Primary Examiner* — Benjamin Fiorello
(74) *Attorney, Agent, or Firm* — Joshua M. Haines

(57) ABSTRACT

A geothermic heater system for heating a geological formation includes a fuel cell stack assembly disposed at the surface of the geological formation and includes a plurality of fuel cells which convert chemical energy from a fuel into electricity through a chemical reaction with an oxidizing agent, thereby producing an anode exhaust and a cathode exhaust. The geothermic fuel cell system also includes a combustor disposed within a bore hole of the geological formation. The combustor combusts a mixture at least one of the anode exhaust and the cathode exhaust to produce a heated combustor exhaust. The combustor discharges the heated combustor exhaust to heat the geological formation.

3 Claims, 2 Drawing Sheets

GEOTHERMIC HEATER SYSTEM

TECHNICAL FIELD OF INVENTION

The present invention relates to a geothermic heater system which uses combustors disposed within a bore hole of a geological formation to heat the geological formation, and more particularly to such a geothermic heater system in which the combustors combust a mixture of at least one of either an anode exhaust and a cathode exhaust from a fuel cell stack assembly located at the surface of the geological formation.

BACKGROUND OF INVENTION

Subterranean heaters have been used to heat subterranean geological formations in oil production, remediation of contaminated soils, accelerating digestion of landfills, thawing of permafrost, gasification of coal, as well as other uses. Some examples of subterranean heater arrangements include placing and operating electrical resistance heaters, microwave electrodes, gas-fired heaters or catalytic heaters in a bore hole of the formation to be heated. Other examples of subterranean heater arrangements include circulating hot gases or liquids through the formation to be heated, whereby the hot gases or liquids have been heated by a burner located on the surface of the earth. While these examples may be effective for heating the subterranean geological formation, they may be energy intensive to operate.

U.S. Pat. Nos. 6,684,948 and 7,182,132 to Savage propose subterranean heaters which use fuel cells as a more energy efficient source of heat. The fuel cells are disposed in a heater housing which is positioned within the bore hole of the formation to be heated. The fuel cells convert chemical energy from a fuel into heat and electricity through a chemical reaction with an oxidizing agent. The heat generated by the fuel cells is used to elevate the temperature of the formation while the electricity that is generated by the fuel cells is conducted out of the bore hole to be used by electricity consuming devices. While the subterranean heaters of U.S. Pat. Nos. 6,684,948 and 7,182,132 may be effective, the fuel cells need to operate for an extended period of time, which will likely be upwards of several years, in order to liberate all of the oil from the formation. During the extended time of operation, it is likely that some fuel cells will fail and the thermal output of the subterranean heaters will decrease and become inefficient or ineffective. While it would be desirable to repair or replace the fuel cells that have failed, repair or replacement of the fuel cells is not possible because the fuel cells are not retrievable from the bore hole after being placed since the subterranean heaters typically extend several hundred feet to in excess of one thousand feet into the formation. Furthermore, the fuel cells cannot be repurposed to a new location after all of the oil has been liberated from the formation.

U.S. patent application Ser. No. 14/013,708 to Fischer et al., the disclosure of which is incorporated herein by reference in its entirety, teaches a subterranean or geothermic heater which uses a combination of fuel cells and combustors to heat a geological formation. The fuel cells and combustors are disposed in a heater housing in an alternating pattern and are operated to heat the heater housing, and consequently the geological formation. The combustors combust a mixture of anode exhaust and cathode exhaust from the fuel cells to produce a heated combustor exhaust which together with the heat produced by the fuel cells heat the geological formation. While the arrangement of Ser. No. 14/013,708 may be effective, the same problems as with U.S. Pat. Nos. 6,684,948 and 7,182,132 may arise since the fuel cells are located in the bore hole just as with the subterranean heaters of U.S. Pat. Nos. 6,684,948 and 7,182,132 as described above.

What is needed is a heater which minimizes or eliminates one or more of the shortcomings as set forth above.

SUMMARY OF THE INVENTION

A geothermic heater system is provided for heating a geological formation. The geothermic heater system includes a fuel cell stack assembly disposed at the surface of the geological formation and having a plurality of fuel cells which convert chemical energy from a fuel into electricity through a chemical reaction with an oxidizing agent, the fuel cell stack assembly having 1) a fuel cell fuel inlet for introducing the fuel to a plurality of anodes of the plurality of fuel cells, 2) a fuel cell oxidizing agent inlet for introducing the oxidizing agent to a plurality of cathodes of the plurality of fuel cells, 3) an anode exhaust outlet for discharging an anode exhaust comprising unspent fuel from the plurality of fuel cells, and 4) a cathode exhaust outlet for discharging a cathode exhaust comprising unspent oxidizing agent from the plurality of fuel cells. The geothermic fuel cell system also includes a combustor for combusting a mixture comprising at least one of the anode exhaust and the cathode exhaust to produce a heated combustor exhaust, the combustor being disposed within a bore hole of the geological formation whereby the combustor discharges the heated combustor exhaust, thereby heating the geological formation. The geothermic heater system allows for the fuel cell stack assembly to be located in an environment that is favorable to startup and operation of the fuel cell stack assembly while taking advantage of the exhaust produced by the fuel cell stack assembly to support operation of the combustor which heats the geological formation.

BRIEF DESCRIPTION OF DRAWINGS

This invention will be further described with reference to the accompanying drawings in which.

DETAILED DESCRIPTION OF INVENTION

Figure 1:
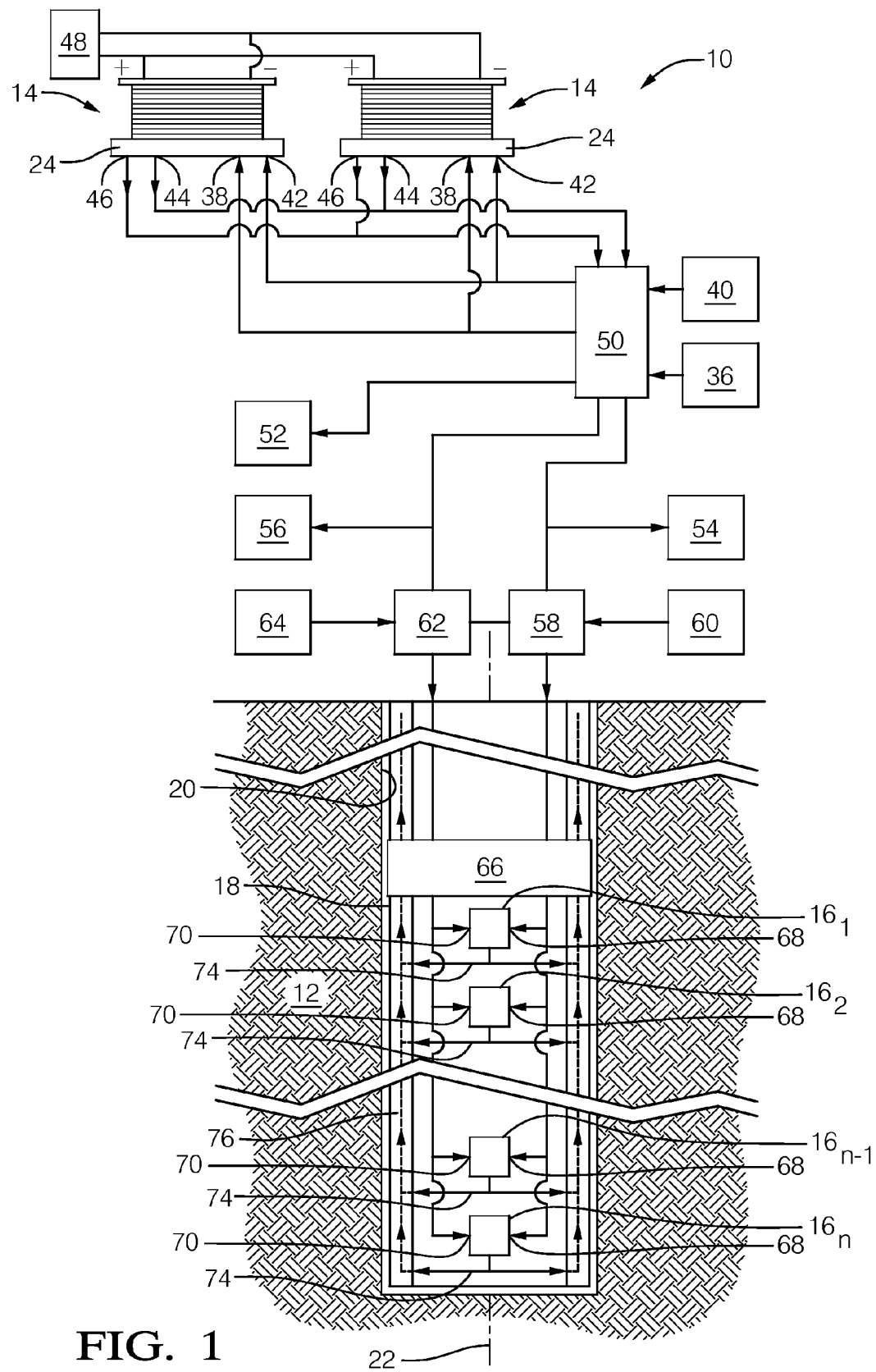
FIG. 1 is a schematic of a geothermic heater system in accordance with the present invention.

Referring now to FIG. 1, a geothermic heater system 10 is shown for heating a geological formation 12, for example only, to liberate oil contained therein. Geothermic heater system 10 generally includes a plurality of fuel cell stack assemblies 14 located at the surface of geological formation 12 and a plurality of combustors $16_1$, $16_2$, . . . $16_{n-1}$, $16_n$ where n is the total number of combustors 16. While two fuel cell stack assemblies 14 have been shown in FIG. 1, it should now be understood that a smaller number or a greater number of fuel cell stack assemblies 14 may be included. Combustors 16 are contained within a heater housing 18 which is disposed within a bore hole 20 extending along a bore hole axis 22 into geological formation 12. As use herein, the surface of geological formation 12 includes the portion of geological formation 12 that people and equipment gain access to bore hole 20 even if it is remote from bore hole 20. Bore hole 20 may be only a few feet deep; however, may typically be several hundred feet deep to in excess of one thousand feet deep. Consequently, the number of combustors 16 needed may range from one to several hundred. It should be noted that the oil containing portion of geological formation 12 may begin as deep as one thousand feet below the surface and consequently, combustor $16_1$ may be located sufficiently deep within bore hole 20 to be positioned near the beginning of the portion of geological formation 12 that is to be heated. It should be understood that heater housing 18 may be segmented into sections which allow for convenient manufacturing and transport of the individual segments such that the segments are subsequently joined together end to end during insertion thereof into bore hole 20. Combustors 16 combust a combustible mixture, provided at least in part by fuel cell stack assemblies 14, in order to heat heater housing 18 and subsequently geological formation 12. The number of combustors 16 within heater housing 18 may be determined, for example only, by one or more of the following considerations: the length of heater housing 18, the heat output capacity of each combustor 16, the desired density of combustors 16 (i.e. the number of combustors 16 per unit of length), the desired heat output of geothermic heater system 10, the depth of geological formation 12 which is desired to be heated, and the location of oil within geological formation 12.

Heater housing 18 may be substantially cylindrical and hollow and may support combustors 16 therewithin. Consequently, heater housing 18 may be made of a material that is substantially strong to accommodate the weight of combustors 16. The material of heater housing 18 may also have properties to withstand the elevated temperatures, for example 600° C. to 900° C., as a result of the operation of combustors 16. For example only, heater housing 18 may be made of a 300 series stainless steel with a wall thickness of $\frac{3}{16}$ of an inch.

Figure 2:
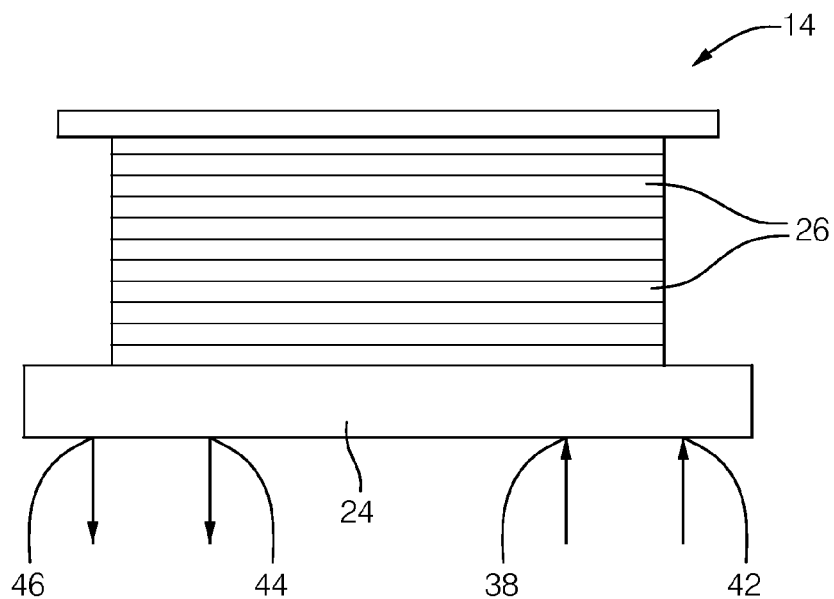
FIG. 2 is a schematic of a fuel cell stack assembly of the geothermic heater system of FIG. 1.
Figure 3:
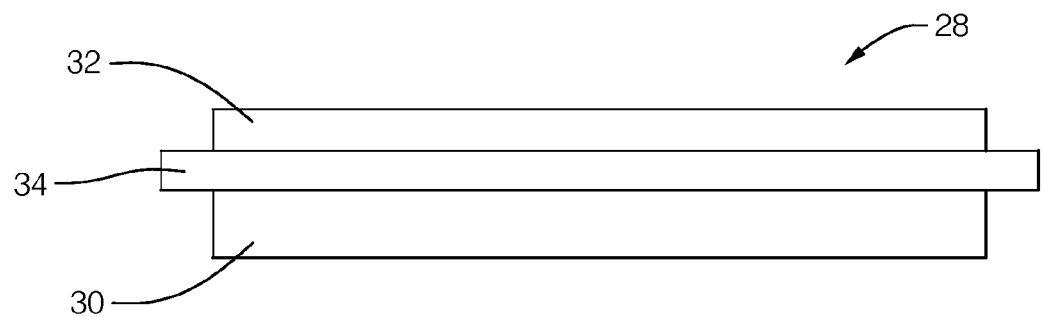
FIG. 3 is a schematic of a fuel cell of the fuel cell stack assembly of FIG. 2.

With continued reference to FIG. 1 and now with additional reference to FIGS. 2 and 3, fuel cell stack assemblies 14 may be, for example only, solid oxide fuel cells which generally include a fuel cell manifold 24 and a plurality of fuel cell cassettes 26 (for clarity, only select fuel cell cassettes 26 have been labeled). Each fuel cell stack assembly 14 may include, for example only, 20 to 50 fuel cell cassettes 26.

Each fuel cell cassette 26 includes a fuel cell 28 having an anode 30 and a cathode 32 separated by a ceramic electrolyte 34. Each fuel cell 28 converts chemical energy from a fuel supplied to anode 30 into heat and electricity through a chemical reaction with air supplied to cathode 32. Fuel cell cassettes 26 have no electrochemical activity below a first temperature, for example, about 500° C., and consequently will not produce heat and electricity below the first temperature. Fuel cell cassettes 26 have a very limited electrochemical activity between the first temperature and a second temperature; for example, between about 500° C. and about 700° C., and consequently produce limited heat and electricity between the first temperature and the second temperature, for example only, about 0.01 kW to about 3.0 kW of heat (due to the fuel self-igniting above about 600° C.) and about 0.01 kW to about 0.5 kW electricity for a fuel cell stack assembly having thirty fuel cell cassettes 26. When fuel cell cassettes 26 are elevated above the second temperature, for example, about 700° C. which is considered to be the active temperature, fuel cell cassettes 26 are considered to be active and produce desired amounts of heat and electricity, for example only, about 0.5 kW to about 3.0 kW of heat and about 1.0 kW to about 1.5 kW electricity for a fuel cell stack assembly having thirty fuel cell cassettes 26. Further features of fuel cell cassettes 26 and fuel cells 28 are disclosed in United States Patent Application Publication No. US 2012/0094201 to Haltiner, Jr. et al. which is incorporated herein by reference in its entirety.

Fuel cell manifold 24 of each fuel cell stack assembly 14 receives fuel and distributes the fuel to each fuel cell cassette 26. The fuel, e.g. a hydrogen rich reformate, may be supplied to each fuel cell manifold 24 from a fuel cell fuel source, illustrated as fuel reformer 36, through a fuel cell fuel inlet 38 of each fuel cell manifold 24. Each fuel cell manifold 24 also receives an oxidizing agent and distributes the oxidizing agent to each fuel cell cassette 26. The oxidizing agent, e.g. air, may be supplied to each fuel cell manifold 24 from a fuel cell oxidizing agent source, illustrated as air supply 40, through a fuel cell air inlet 42 of each fuel cell manifold 24. Each fuel cell manifold 24 also receives anode exhaust, i.e. spent fuel and excess fuel from fuel cells 28 which may comprise $H_2$, $CO$, $H_2O$, $CO_2$, and $N_2$, and discharges the anode exhaust from each fuel cell manifold 24 through an anode exhaust outlet 44. Each fuel cell manifold 24 also receives cathode exhaust, i.e. spent air and excess air from fuel cells 28 which may comprise $O_2$ (depleted compared to the air supplied from air supply 40) and $N_2$, and discharges the cathode exhaust from each fuel cell manifold 24 through a cathode exhaust outlet 46.

Now again with reference to FIG. 1, the electricity that is generated by fuel cell stack assemblies 14 is communicated to an electric load 48 which may be, for example only, an electric consuming device or utility grid. While fuel cell stack assemblies 14 have been illustrated as being connected electrically in parallel, it should now be understood that fuel cell stack assemblies 14 may be connected electrically in series or may not be connected electrically at all. It should also be understood that when more than two fuel cell stack assemblies 14 are provided, some fuel cell stack assemblies 14 may be connected electrically in parallel while other fuel cell stack assemblies 14 may be connected electrically in series. Furthermore, while fuel cell stack assemblies 14 have been shown connected to a single common electric load 48, it should now be understood that fuel cell stack assemblies 14 may be commonly connected to a plurality of common electric loads 48. It should also be understood that fuel cell stack assemblies 14 may be connected to distinct electric loads, that is, one fuel cell stack assembly 14 may be connected only to a first electric load while another fuel cell stack assembly 14 may be connected only to a second electric load.

After leaving fuel cell stack assemblies 14, the anode exhaust and the cathode exhaust from fuel cell stack assemblies 14 is communicated to a fuel cell exhaust to fuel cell inlet heat exchanger 50. The anode exhaust and the cathode exhaust from fuel cell stack assemblies 14 passes through one side of fuel cell exhaust to fuel cell inlet heat exchanger 50 while the fuel from fuel reformer 36 and the air from air supply 40 passes through the other side of fuel cell exhaust to fuel cell inlet heat exchanger 50 in order to transfer heat from the anode exhaust and the cathode exhaust that is exiting fuel cell stack assemblies 14 to the fuel and the air that is entering fuel cell stack assemblies 14. Fuel cell exhaust to fuel cell inlet heat exchanger 50 may also be used to condense water out of the anode exhaust and/or the cathode exhaust. The water that is condensed out of the anode exhaust and/or the cathode exhaust may be communicated out of fuel cell exhaust to fuel cell inlet heat exchanger 50 to a water utilization device 52. It should now be understood that fuel cell exhaust to fuel cell inlet heat exchanger 50 may be substituted with separate heat exchangers for the anode exhaust and the cathode exhaust.

An anode exhaust utilization device 54 may be provided downstream of fuel cell exhaust to fuel cell inlet heat exchanger 50. Anode exhaust utilization device 54 may be configured to receive some, all, or none of the anode exhaust from fuel cell stack assemblies 14. For example, when fuel cell stack assemblies 14 produce anode exhaust in excess of what combustors 16 require for operation, the excess portion of the anode exhaust may be communicated to anode exhaust utilization device 54. Anode exhaust utilization device 54 may be used, for example only, to produce steam, drive compressors, or supply a fuel reformer. Conversely, when combustors 16 require all of the anode exhaust produced by fuel cell stack assemblies 14, none of the anode exhaust produced by fuel cell stack assemblies 14 may be provided to anode exhaust utilization device 54. It should be noted that the portion of the anode exhaust that is communicated to anode exhaust utilization device 54 is not communicated to combustors 16.

Similarly, a cathode exhaust utilization device 56 may be provided downstream of fuel cell exhaust to fuel cell inlet heat exchanger 50. Cathode exhaust utilization device 56 may be configured to receive some, all, or none of the cathode exhaust from fuel cell stack assemblies 14. For example, when fuel cell stack assemblies 14 produce cathode exhaust in excess of what combustors 16 require for operation, the excess portion of the anode exhaust may be communicated to cathode exhaust utilization device 56. Cathode exhaust utilization device 56 may be, for example only, a heat exchanger, a condenser, or a combustor. Conversely, when combustors 16 require all of the cathode exhaust produced by fuel cell stack assemblies 14, none of the cathode exhaust produced by fuel cell stack assemblies 14 may be provided to cathode exhaust utilization device 56. It should be noted that the portion of the cathode exhaust that is communicated to cathode exhaust utilization device 56 is not communicated to combustors 16.

An anode exhaust pump 58 may be provided downstream of fuel cell exhaust to fuel cell inlet heat exchanger 50 for propelling the anode exhaust to combustors 16. In addition to or alternative to propelling the anode exhaust to combustor 16, anode exhaust pump 58 may propel a secondary fuel from a secondary fuel source 60 to combustors 16. Secondary fuel source 60 may be, for example only, a fuel reformer which may be fuel reformer 36. In this way, when fuel cell stack assemblies 14 are not producing sufficient anode exhaust to satisfy the demand of combustors 16 or when anode exhaust utilization device 54 leaves an insufficient amount of anode exhaust to satisfy the demand of combustors 16, secondary fuel source 60 may supply sufficient secondary fuel to satisfy the demands of combustors 16.

Similarly, a cathode exhaust pump 62 may be provided downstream of fuel cell exhaust to fuel cell inlet heat exchanger 50 for propelling the cathode exhaust to combustors 16. In addition to or alternative to propelling the cathode exhaust to combustor 16, cathode exhaust pump 62 may propel a secondary oxidizing agent, e.g. air, from a secondary oxidizing agent source, illustrated as secondary air source 64, to combustors 16. Secondary air source 64 may be, for example only, air supply 40. In this way, when fuel cell stack assemblies 14 are not producing sufficient cathode exhaust to satisfy the demand of combustors 16 or when cathode exhaust utilization device 56 leaves an insufficient amount of cathode exhaust to satisfy the demand of combustors 16, secondary air source 64 may supply sufficient secondary air to satisfy the demands of combustors 16.

A combustor exhaust to combustor inlet heat exchanger 66 may be provided in heater housing 18 such that combustor exhaust to combustor inlet heat exchanger 66 is located above combustors 16 and preferably in close proximity to combustor $16_1$. The anode exhaust gas and secondary fuel, hereinafter referred to as combustor fuel, from anode exhaust pump 58 and the cathode exhaust and the secondary air, herein after referred to as combustor air, from cathode exhaust pump 62 pass through one side of combustor exhaust to combustor inlet heat exchanger 66 and are heated by heated combustor exhaust from combustors 16 that passes through the other side of combustor exhaust to combustor inlet heat exchanger 66 as will be described in greater detail later.

Figure 4:
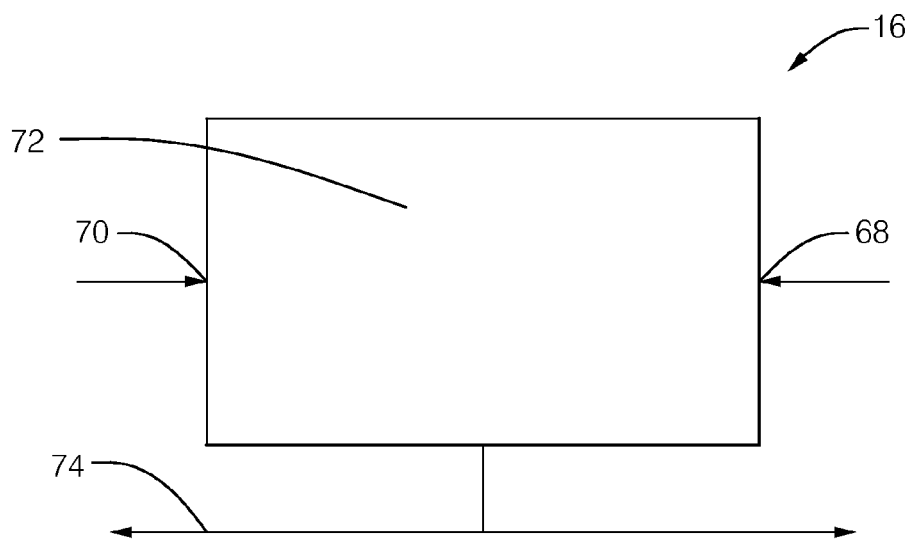
FIG. 4 is a schematic of a combustor of the geothermic heater system of FIG. 1.

With continued reference to FIG. 1 and now with additional reference to FIG. 4, each combustor 16 may include a combustor fuel inlet 68, a combustor oxidizing agent inlet 70; hereinafter referred to as combustor air inlet 70, a combustion chamber 72, and a combustor exhaust outlet 74. Each combustor 16 may receive the combustor fuel through combustor fuel inlet 68. Similarly, each combustor 16 may also receive the combustor air through combustor air inlet 70. The combustor fuel and the combustor air that are supplied to each combustor 16 are mixed within combustion chamber 72 to form a combustible mixture which is combusted to form a heated combustor exhaust. The heated combustor exhaust is discharged from combustor 16 through combustor exhaust outlet 74 into heater housing 18. Combustor exhaust outlet 74 may be arranged to communicate the heated combustor exhaust to an annular space 76 which is defined radially between heater housing 18 and a baffle 78 which is disposed coaxially within heater housing 18. Communicating the heated combustor exhaust to annular space 76 aids in transferring heat from the heated combustor exhaust to heater housing 18 and consequently to geological formation 12, thereby heating geological formation 12. The heated combustor exhaust that is discharged into heater housing 18 from combustors 16 naturally rises through heater housing 18 toward the surface of geological formation 12, thereby passing through combustor exhaust to combustor inlet heat exchanger 66 to heat the combustor fuel and the combustor air as may be conducive to combusting the mixture of combustor fuel and combustor air in combustors 16.

It should now be understood that electric load 48 may be, for example only, one or more electric heaters that are positioned within bore hole 20 and interspersed with combustors 16. In this way, when fuel cell stack assemblies 14 produce excess electricity, the excess electricity can be used to produce additional heat which may allow anode exhaust utilization device 54 and cathode exhaust utilization device 56 to receive more anode exhaust and cathode exhaust respectively or may allow less fuel to be supplied to fuel cell stack assemblies 14, thereby resulting in greater system efficiency.

In one aspect of controlling the amount of heat released by combustors 16, the amount of combustor air supplied to combustors 16 may be decreased such that combustors 16 are operated rich of stoichiometry. The amount of combustor air can be decreased to produce the desired thermal output of combustors 16. As a result, excess combustor fuel, comprising large amounts of hydrogen, will be exhausted from bore hole 20 where it can be collected and utilized, for example, by anode exhaust utilization device 54.

Placement of fuel cell stack assemblies 14 at the surface of geological formation 12 allows easy access to fuel cell stack assemblies 14 in the event of malfunction thereof and also minimizes the effects of malfunction of a single fuel cell stack assembly 14 on the heating of geological formation 12 since fuel cell stack assemblies 14 are not directly heating geological formation 12. Placement of fuel cell stack assemblies 14 at the surface of geological formation 12 also allows electricity generated by fuel cell stack assemblies 14 to be communicated to electric load 48 without the need for electrical conductors being placed within heater housing 18. It may be desirable to not have electrical conductors within heater housing 18 because of the transmission loss that may result due to the long length needed for the conductors to reach the bottom of heater housing 18, because of the harsh environment the conductors would be subjected to within heater housing 18, and because of the space the conductors would occupy in heater housing 18 thereby requiring heater housing 18 to be made larger to accommodate the conductors. Placement of fuel cell stack assemblies 14 at the surface of geological formation 12 also allows fuel cell stack assemblies 14 to be easily repurposed at another site when geological formation 12 has been depleted of oil. Placement of fuel cell stack assemblies 14 at the surface of geological formation 12 may also aid in startup and operation of fuel cell stack assemblies 14 since fuel cell stack assemblies 14 are in a controlled environment and can be more easily monitored for potential failures that can be corrected early. Furthermore, combustors 16 are typically more robust and less susceptible to the environmental conditions experienced within bore hole 20 than fuel cell stack assemblies 14, thereby resulting in a more robust system.

While this invention has been described in terms of preferred embodiments thereof, it is not intended to be so limited, but rather only to the extent set forth in the claims that follow.

We claim:

1. A geothermic heater system for heating a geological formation, said geothermic heater system comprising:
   a fuel cell stack assembly disposed at the surface of said geological formation and having a plurality of fuel cells which convert chemical energy from a fuel into electricity through a chemical reaction with an oxidizing agent, said fuel cell stack assembly having 1) a fuel cell fuel inlet for introducing said fuel to a plurality of anodes of said plurality of fuel cells, 2) a fuel cell oxidizing agent inlet for introducing said oxidizing agent to a plurality of cathodes of said plurality of fuel cells, 3) an anode exhaust outlet for discharging an anode exhaust comprising unspent fuel from said plurality of fuel cells, and 4) a cathode exhaust outlet for discharging a cathode exhaust comprising unspent oxidizing agent from said plurality of fuel cells;
   a combustor for combusting a mixture comprising said anode exhaust and said cathode exhaust to produce a heated combustor exhaust, said combustor being disposed within a bore hole of said geological formation whereby said combustor discharges said heated combustor exhaust, thereby heating said geological formation; and
   an anode exhaust utilization device configured to receive a portion of said anode exhaust such that said portion of said anode exhaust is not communicated to said combustor.

2. A geothermic heater system for heating a geological formation, said geothermic heater system comprising:
   a fuel cell stack assembly disposed at the surface of said geological formation and having a plurality of fuel cells which convert chemical energy from a fuel into electricity through a chemical reaction with an oxidizing agent, said fuel cell stack assembly having 1) a fuel cell fuel inlet for introducing said fuel to a plurality of anodes of said plurality of fuel cells, 2) a fuel cell oxidizing agent inlet for introducing said oxidizing agent to a plurality of cathodes of said plurality of fuel cells, 3) an anode exhaust outlet for discharging an anode exhaust comprising unspent fuel from said plurality of fuel cells, and 4) a cathode exhaust outlet for discharging a cathode exhaust comprising unspent oxidizing agent from said plurality of fuel cells;
   a combustor for combusting a mixture comprising said anode exhaust and said cathode exhaust to produce a heated combustor exhaust, said combustor being disposed within a bore hole of said geological formation whereby said combustor discharges said heated combustor exhaust, thereby heating said geological formation; and
   a cathode exhaust utilization device configured to receive a portion of said cathode exhaust such that said portion of said cathode exhaust is not communicated to said combustor.

3. A geothermic heater system for heating a geological formation, said geothermic heater system comprising:
   a fuel cell stack assembly disposed at the surface of said geological formation and having a plurality of fuel cells which convert chemical energy from a fuel into electricity through a chemical reaction with an oxidizing agent, said fuel cell stack assembly having 1) a fuel cell fuel inlet for introducing said fuel to a plurality of anodes of said plurality of fuel cells, 2) a fuel cell oxidizing agent inlet for introducing said oxidizing agent to a plurality of cathodes of said plurality of fuel cells, 3) an anode exhaust outlet for discharging an anode exhaust comprising unspent fuel from said plurality of fuel cells, and 4) a cathode exhaust outlet for discharging a cathode exhaust comprising unspent oxidizing agent from said plurality of fuel cells;
   a combustor for combusting a mixture comprising said anode exhaust to produce a heated combustor exhaust, said combustor being disposed within a bore hole of said geological formation whereby said combustor discharges said heated combustor exhaust, thereby heating said geological formation; and
   an anode exhaust utilization device configured to receive a portion of said anode exhaust such that said portion of said anode exhaust is not communicated to said combustor.

* * * * *